Nov. 2, 1943.                J. D. RYDER                    2,333,393
                           MEASURING SYSTEM
                        Filed Dec. 24, 1941           3 Sheets-Sheet 1
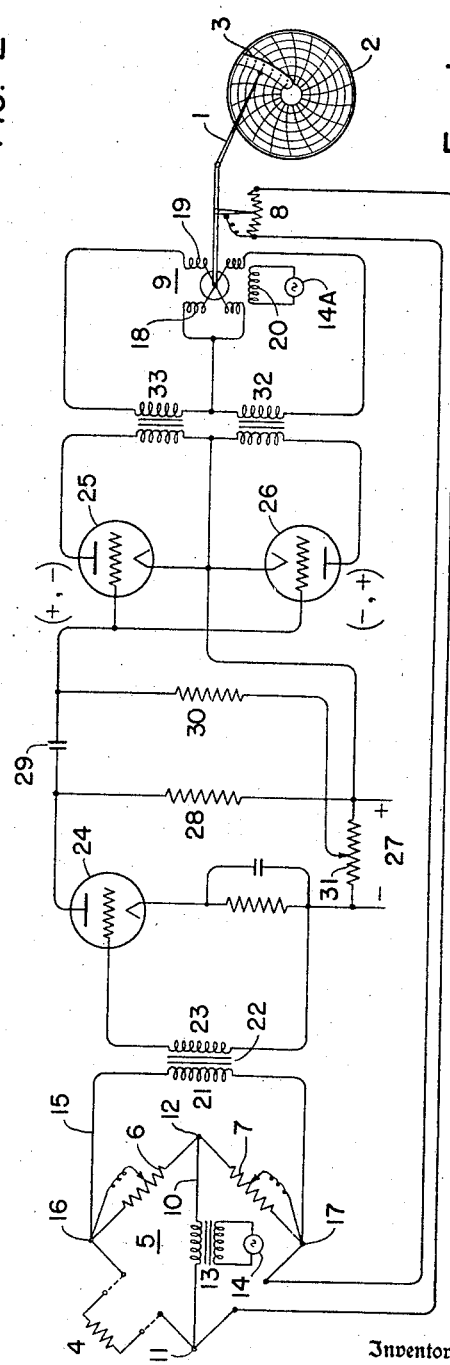
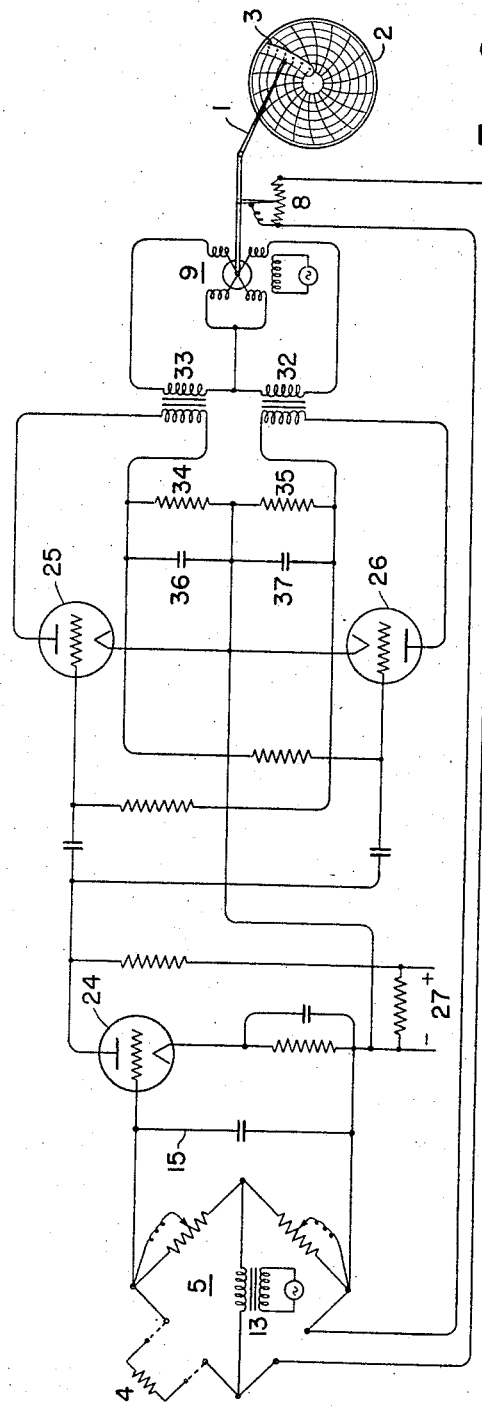
Inventor
JOHN D. RYDER
By Raymond W. Junkins
Attorney Nov. 2, 1943.    J. D. RYDER    2,333,393
MEASURING SYSTEM
Filed Dec. 24, 1941    3 Sheets-Sheet 2

Inventor
JOHN D. RYDER
By Raymond D. Junkins
Attorney

Nov. 2, 1943.　　　　J. D. RYDER　　　　2,333,393
MEASURING SYSTEM
Filed Dec. 24, 1941　　　3 Sheets-Sheet 3

Inventor
JOHN D. RYDER
By Raymond D. Junkins
Attorney

Patented Nov. 2, 1943

2,333,393

UNITED STATES PATENT OFFICE 2,333,393

MEASURING SYSTEM

John D. Ryder, Ames, Iowa, assignor to Bailey Meter Company, a corporation of Delaware Application December 24, 1941, Serial No. 424,281

12 Claims. (Cl. 172—239)

This invention relates to apparatus and electric circuits for exhibiting and/or controlling the magnitude of a variable of a physical, chemical or electrical nature, such as pressure, temperature, rate of fluid flow, electromotive force, etc.

In accordance with my invention variations in a variable quantity or condition are translated into variations in an electrical effect, and this effect is then amplified solely through electrical means until sufficient power is available for doing useful work, such as moving an indicator or other exhibiting means or for regulating the rate of application of an agent contributing to the production or maintenance of the variable.

In devices of the same general type at present known wherein variations in the variable are translated into variations in an electrical effect, the necessary amplification is done, at least in part, by mechanical means. We thus have variations in magnitude of the variable translated into variations in an electrical effect, which is then translated into a corresponding mechanical movement, such as the deflection of a galvanometer, and thence usually the mechanical movement is translated back into an electrical effect for operating the exhibiting or control device. Because of the small power available in the first electrical effect, such devices usually operate on the step by step principle. That is to say, upon a change in the variable the exhibiting or control device is not continuously operated in correspondence with such changes, but periodically by means of a feeler mechanism the exhibiting or control device is changed an amount corresponding to the amount of change in the variable during succeeding increments of time. For a description of a device of this type, reference may be made to my United States Patent No. 2,015,968.

It is evident that such devices are necessarily complicated and delicate and do not correctly exhibit the variable during transient periods. My invention is particularly concerned with the elimination of all mechanical movements between the sensitive device and the exhibiting or control device, leading to simplification and removal of the usual time delay, so that the device accurately exhibits the magnitude of the variable even during transient periods. It is evident that many ancillary advantages will follow, among which may be mentioned as obvious the elimination of wear of mechanical parts and elimination of the necessity for periodic inspection and adjustment to correct for inaccuracies occasioned by mechanical wear. For a complete understanding of my invention reference should be made to the description to follow and the drawings in which:

Fig. 1 is a diagrammatic arrangement of apparatus and electric circuit embodying my invention.

Figs. 2, 3 and 4 illustrate modified forms of the embodiment of my invention shown in Fig. 1.

Figure 3:
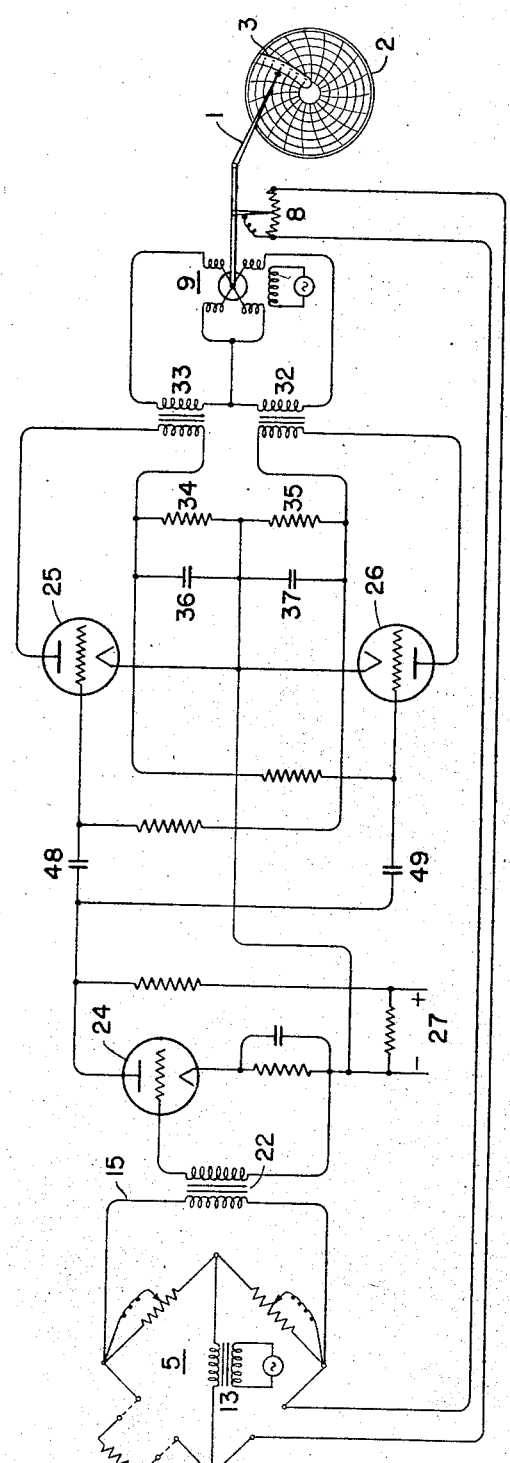

Referring now in particular to Fig. 1, I have illustrated therein my invention arranged to visually exhibit by means of a movable index 1 and cooperating time revoluble chart 2 and scale 3 the magnitude of a variable impedance 4. The index, chart and scale are merely specific forms of exhibiting means which may take a wide variety of other forms, as will be evident to those skilled in the art. The variable impedance 4 is shown specifically as a resistance which may be made sensitive to a variable, such as temperature for example, which it is desired to visibly exhibit. It is evident, however, as will be pointed out in greater detail hereinafter, that the impedance to which the apparatus is responsive may be made sensitive to any variable condition, quantity, or quality which it is desired to measure and/or to control. Broadly, therefore, my invention contemplates the use of any impedance such as a resistance, condenser, inductance, or the like which may be used to produce an electrical effect varying in correspondence with the variable which it is desired to measure and/or control.

To provide an accurate and sensitive measuring system, I preferably employ the null or zero balance method wherein a variable effect of measurable value is maintained equal to or in some predetermined proportion to the electrical effect produced by the variable, and hence becomes a measure of the variable. In the embodiment shown in Fig. 1 I employ an alternating current Wheatstone bridge generally indicated at 5 and having as arms the resistance 4 and adjustable resistances 6, 7 and 8. The resistance 8, which is moved in consonance with the index 1 by a motor 9, is the balancing resistance and through means hereinafter described is continuously varied to maintain the bridge in balance, and hence the magnitude thereof becomes a measure of the resistance 4, and inferentially of the variable to which the latter is sensitive.

The bridge 5 is provided with a conjugate conductor 10 connecting diagonally opposite points 11 and 12 of the bridge, and which is inductively coupled through a transformer 13 to a source of alternating current 14. A second conjugate conductor 15 is connected across the remaining diagonally opposite points 16 and 17 of the bridge. Assuming the bridge to be in balance, no current will pass through the conjugate conductor 15 as points 16 and 17 will be at equal potential. If now, due to a change in the variable, the resistance 4 is increased, a difference in potential will exist between points 16 and 17 and current will flow through the conjugate conductor 15. This current will have a certain polarity or phase relation with respect to the source 14. If the bridge is unbalanced by a decrease in the resistance 4, a current of opposite polarity or phase with respect to the source 14 will flow through the conjugate conductor 15. By means hereinafter to be described, I employ this change in polarity or phase of the current in the conjugate conductor 15, with respect to the polarity or phase of the current produced by the source 14, to selectively operate the motor 9 in one direction or another to vary the resistance 8 in proper sense to maintain the Wheatstone bridge 5 in balance.

The motor 9 is shown as having opposed pole windings 18 and 19 and an alternating current field winding 20 energized by a source 14A. If the pole winding 18 is short circuited the motor will rotate in one direction, and if the winding 19 is short circuited the motor will rotate in opposite direction. If both windings 18 and 19 are simultaneously short circuited the motor will not rotate in either direction.

Upon an unbalance of the bridge 5, the particular winding short circuited to produce rotation of the motor 9 is determined by the polarity or phase of the current in the conjugate conductor 15. Rotation of the motor 9 will vary the resistance 8 in proper direction to restore the bridge to balance. It is evident that upon a slight change in the resistance 4 the current in the conjugate conductor 15 will be of relatively small magnitude. So that such minute current may be used to control the selective short circuiting of the windings 18 and 19, I provide electrical amplifying means.

Connected in the conjugate conductor 15 is the primary 21 of a transformer 22 having a secondary 23 connected in the input circuit of an electron discharge device 24 for controlling the motor control tubes 25, 26. The tubes 25, 26 are preferably arranged in circuit to have opposite polarity, that is the anode of the tube 25 is positive during one half cycle and the anode of the tube 26 is positive during the remaining half cycle. Unbalance of the bridge in one sense will then produce a current of the same polarity as the tube 25 for example, effecting rotation of the motor 9 in one direction. Unbalance of the bridge in opposite direction will produce a current having the same polarity as the tube 26 and accordingly effect operation of the motor 9 in opposite direction.

The output circuit of the device 24 is shown as including the source of direct current 27 and a resistance 28. The grid of the device 24 may be biased so that it is non-conducting or conducting a predetermined amount. Such direct current as normally flows through the output circuit of the device 24 has no effect upon the potential impressed upon the grids of the tubes 25 and 26 by virtue of a condenser 29. Upon passage of alternating current through the conjugate conductor 15 however, the current in the output circuit of the device 24 becomes pulsating in character, which will pass through the condenser 29 and render either the tube 25 or 26 conducting selectively in accordance with the sense of unbalance of the bridge 5.

The tubes 25 and 26 may normally be maintained non-conducting. This is accomplished by connecting the grids through a resistance 30 to a voltage divider 31. To provide a high degree of sensitivity in some cases it may be preferable to maintain the tubes 25 and 26 normally conducting, in which case the pulsating current originating due to unbalance of the bridge 5 will selectively render one or the other of the tubes more conducting.

As hereinbefore stated, the polarity of the current in the conjugate conductor 15 depends upon the sense of change in the resistance 4. Likewise the polarity of the current in the output circuit of the device 24 will depend upon the sense of change in the resistance 4. The pulsating current passing through the output circuit of the device 24 is utilized to control the current transmission through the pair of electron discharge devices or motor control tubes 25 and 26, the output circuits of which are inductively coupled through transformers 32 and 33 to the circuits of the pole windings 18 and 19 respectively. Upon the tube 25 being rendered conducting, the impedance of the primary of the transformer 33 is lowered sufficiently so that the winding 19 is effectively short circuited, causing rotation of the motor 9 in one direction. Likewise when the tube 26 is rendered conducting, the impedance of the primary of the transformer 32 is sufficiently decreased so that the winding 18 is effectively short circuited, causing rotation of the motor 9 in opposite direction. The transformers 32 and 33 may be considered as the current source for the tubes 25 and 26. In the embodiment shown in Fig. 1, I preferably arrange the devices 25, 26 so that they are of opposite polarity.

The pulsating component of the current in the output circuit of the device 24 is impressed upon the grids of the tubes 25 and 26 through a condenser 29 which inhibits the passage of direct current. It will therefore be solely the component of the current in the output circuit of the device 24, produced by the flow of current in the conjugate conductor 15, which will be effective for controlling the grid-cathode potential relationship of the tubes 25 and 26. As the tubes 25 and 26 have opposite polarity the particular tube rendered conducting during each half cycle when the proper anode-cathode potential relationship exists will be determined by the polarity of the current passing through the conductor 15. The particular pole winding of the motor 9 which is energized upon unbalance of the bridge is selectively determined therefore in dependence upon the sense of unbalance of the bridge. As heretofore described, operation of the motor 9 serves to position the index 1 and also to vary the balancing resistance 8 to restore the bridge to balance. As well understood, the magnitude of the resistance 8, and accordingly the position of the index 1, is a measure of the magnitude of the resistance 4, and accordingly of the variable to which the latter is responsive.

A particular function of the bridge output transformer 22 is for amplification of the minute voltages and voltage changes in the conjugate conductor 15. In the measurement of certain small ranges in temperature for example, resulting in small voltage and current values and changes in value in the bridge 5, it is desirable to have the bridge output transformer 22 for amplification. A particular feature of the present invention however is a modification of the circuit arrangement of Fig. 1, whereby the relatively expensive amplifying transformer 22 may be eliminated. Such an arrangement I have illustrated in Fig. 2, wherein the sensitivity of the measuring circuit has been materially increased, even though the amplifying transformer 22 has been eliminated.

In general (referring to Fig. 2) I materially increase the sensitivity obtained from the motor control tubes 25, 26 by means of a feed back of voltage from output to input. When an alternating current voltage is applied to the input of the motor control tubes 25, 26, the plate current of one tube is increased and the plate current of the other tube is decreased. Since both motor shading poles have been equally energized in the equilibrium condition, the change in plate currents upsets this equal energization and the motor rotates. Now if by some means the increased plate current of the one tube could be used to cause the plate current of the other tube to decrease still further, then increased sensitivity would result. A given input voltage would then produce a greater plate current differential between the two tubes 25, 26, and this is exactly what is accomplished by the circuit shown in Fig. 2.

The input to the two motor control tubes 25, 26 is split so that each tube has its own grid leak and bias circuit while still receiving all of the input signal. The grid bias, instead of being furnished by the power supply is now supplied independently to each tube by the voltage drop across a resistor in the plate circuit of the other tube. These resistors 34, 35 are by-passed by condensers 36, 37 respectively.

At equilibrium each tube 25 or 26 has equal bias since plate currents must adjust to equality in order to stop the motor. If tube 25 receives an input signal of polarity such as to cause its plate current to increase, then the plate current of tube 26 will be decreased by the same signal. The increased plate current of tube 25 causes a greater voltage drop across its resistor, thereby applying a further negative voltage to the grid of the tube 26, reducing its plate current still further and causing the motor to run faster. A reversed input signal results in the opposite effect.

It is of course quite possible to utilize the circuit arrangement of Fig. 2 with the amplifying transformer 22 of Fig. 1, and this combination I have shown in Fig. 3. Here the primary of the amplifying transformer 22 is connected in the conjugate conductor 15 and the transformer 22 controls the input circuit of the device 24, which in turn, by means of the polarity or phase of the current flowing therethrough, controls selectively the tubes 25, 26 for control of the motor 9.

Figure 4:
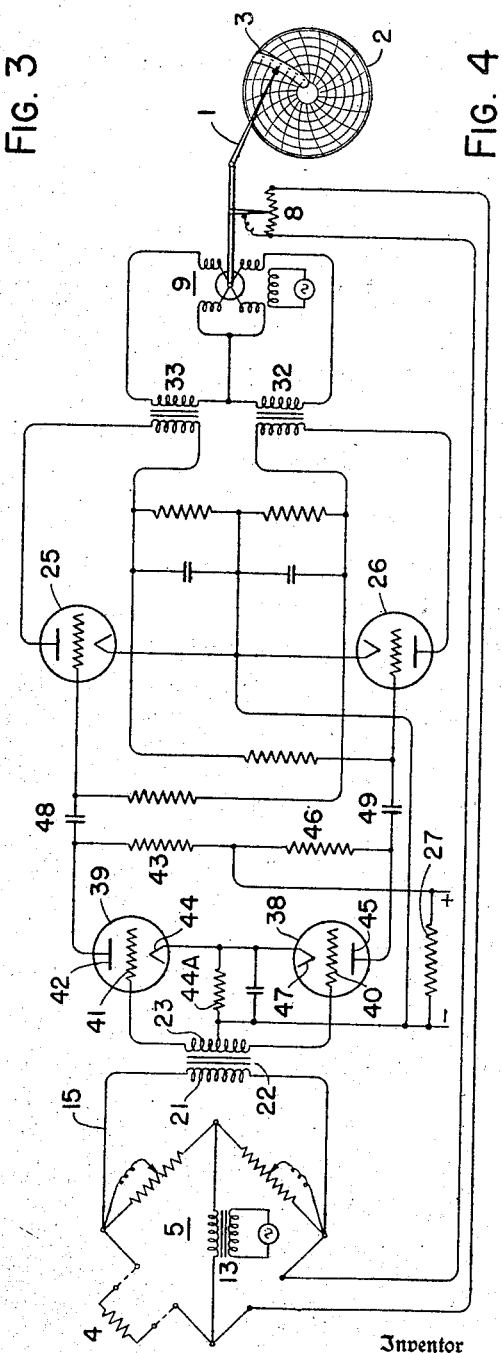

In Fig. 4 I show a further modification of the arrangement of Fig. 3 having the device 24 replaced by a pair of electron discharge devices 38 and 39. Connected in the conjugate conductor 15 is the primary 21 of the transformer 22 having a secondary 23, the opposite terminals of which are connected to the grids 40 and 41 of the electron discharge devices 38 and 39 respectively. The device 39 has an output circuit which includes an anode 42 connected through a resistance 43 to one side of the direct current source 27, and a cathode 44 which is connected through a resistance 44A to a center tap in the secondary 23 and to the opposite side of the source 27. The output circuit arrangement of the device 38 is similar to that of the device 39. The anode 45 being connected through a resistance 46 to one side of the direct current source 27 whereas the cathode 47 is connected to the center tap of the secondary 23 and to the opposite side of the source 27 through a resistance 44A.

Assuming that no current passes through the conjugate conductor 15, so that no voltage is induced in the secondary 23, it is evident that by proper circuit arrangements the devices 38 and 39 may be made to pass currents of predetermined magnitude through their output circuits, or if desired the grids 40 and 41 may be sufficiently biased so that both devices are substantially non-conducting. Assuming now that alternating current is passing through the conjugate conductor 15, by virtue of the fact that the grid 40 is connected to the opposite terminal of the secondary 23 than is the grid 41, then when the grid 41 is being made more positive with respect to the anode 42, the grid 40 is being made more negative with respect to the anode 45. Upon a reversal of the alternating current in the conjugate conductor 15 the reverse will occur, the grid 40 then being made more positive with respect to the anode 45 and the grid 41 being made more negative with respect to the anode 42. With alternating current passing through the conjugate conductor 15 a pulsating current will therefore pass through the output circuits of the electron discharge devices 38 and 39 and, by virtue of the amplifying characteristics of the transformer 22 and of the devices 38 and 39, the voltage passing through the output circuits will be greater than that passing through the conjugate conductor 15. As hereinbefore stated, the polarity of the current in the conjugate conductor 15 depends upon the sense of change in the resistance 4. Likewise the polarity of the current in the output circuits of the devices 38 and 39 will depend upon the sense of change in the resistance 4.

The pulsating current passing through the output circuit of the devices 38 and 39 is utilized to control the current transmission through the motor control tubes 25 and 26, the output circuits of which are inductively coupled through transformers 32 and 33 to the circuits of the pole windings 18 and 19 respectively. Upon the tube 25 being rendered conducting, the impedance of the primary of the transformer 33 is lowered sufficiently so that the winding 19 is effectively short circuited, causing rotation of the motor 9 in one direction. Likewise when the device 26 is rendered conducting, the impedance of the primary of the transformer 32 is sufficiently decreased so that the winding 18 is effectively short circuited, causing rotation of the motor 9 in opposite direction. The transformers 32 and 33 may be considered as the current source for the tubes 25 and 26. In the embodiment shown in Fig. 4 I preferably arrange the tubes 25 and 26 so that they are of the same polarity, that is the anodes of the devices are simultaneously positive and negative with respect to their associated cathodes. During the half cycle when the anodes are positive, the devices may be rendered conducting or non-conducting by control of the grid or input circuits, as will be understood by those familiar with the art. When the anodes are negative with respect to their associated cathodes, the devices are substantially non-conducting regardless of the potential relation which may exist between the grid and cathode.

The pulsating component of the current in the output circuits of the devices 38 and 39 is impressed upon the grids of the tubes 25 and 26 through condensers 48 and 49 which inhibit the passage of direct current. It will, therefore, be solely the component of the current in the output circuit of the devices 38 and 39 produced by the flow of current in the conjugate conductor 15 which will be effective for controlling the grid-cathode potential relationship of the tubes 25 and 26. As the tubes 25 and 26 have the same polarity, the particular device rendered conducting each half cycle when the proper anode-cathode potential relation exists will be determined by the polarity of the current passing through the conductor 15. That is to say, upon unbalance of the bridge in one sense, the polarity of the current in the conjugate conductor 15 will be such that the grid of the tube 26 will be rendered positive during the half cycle when the anode thereof is positive with respect to its cathode so that the device will be rendered conducting. If, however, the bridge had been unbalanced in the opposite direction, then during the same half cycle the grid of the tube 25 would have been rendered negative with respect to the potential of its cathode so that that tube would have remained non-conducting. In the latter case, however, the grid of the tube 26 would have been rendered more positive with respect to the potential of the cathode, so that it would have been rendered conducting. The particular pole winding of the motor 9 which is energized upon unbalance of the bridge is selectively determined therefore in dependence upon the sense of unbalance of the bridge. As hereinbefore described, the operation of the motor 9 serves to position the index 1 and also to vary the balancing resistance 8 to restore the bridge to balance. As well understood, the magnitude of the resistance 8, and accordingly the position of the index 1, is a measure of the magnitude of the resistance 4, and accordingly of the variable to which the latter is responsive.

Figure 5:
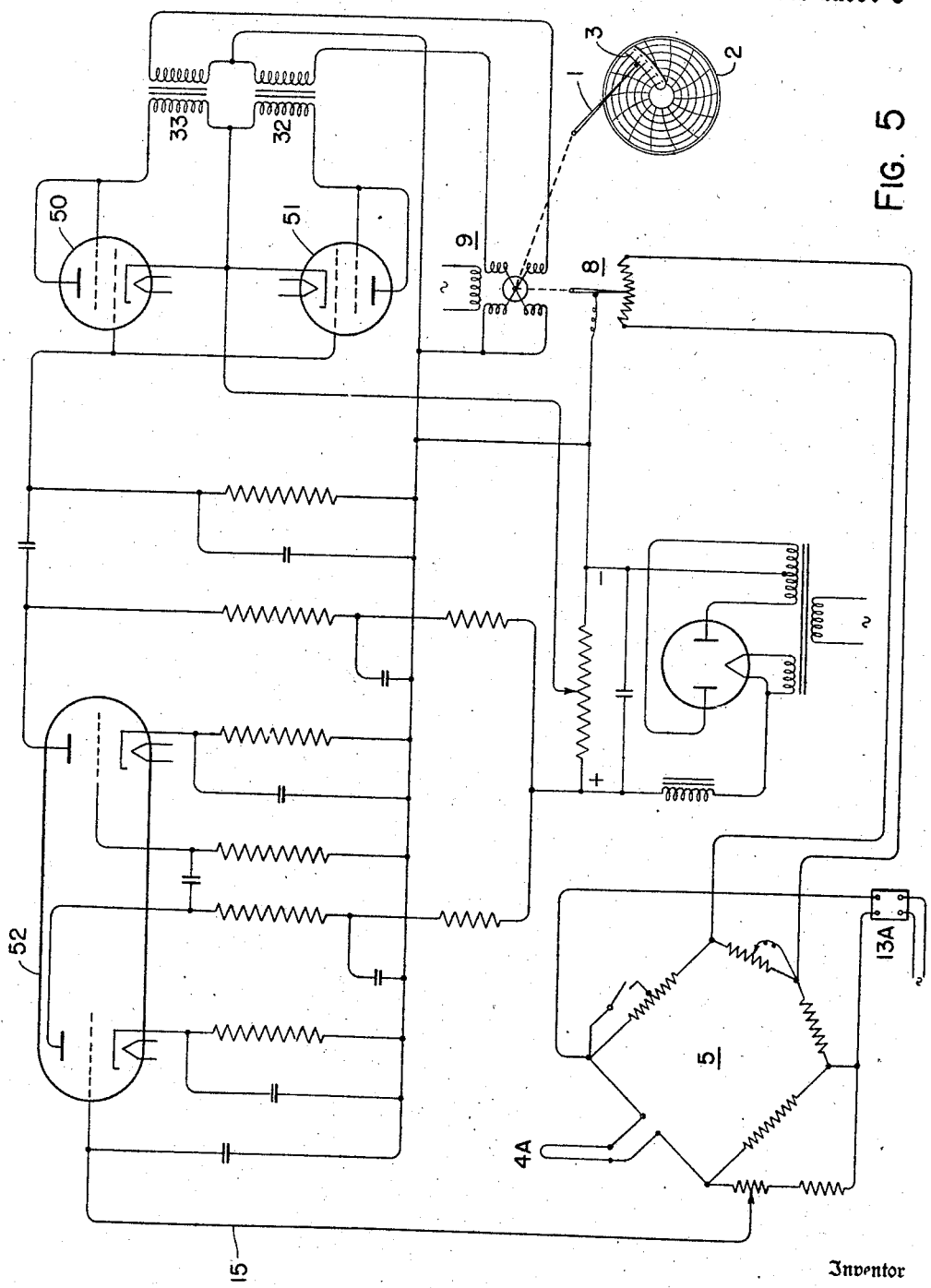
Fig. 5 illustrates my invention as applied to a gas analyzing apparatus.

In Fig. 5 I illustrate a further embodiment of my invention in connection with a gas analyzing apparatus. Herein the impedance 4A is a catalytic wire, such as a platinum wire, normally heated to about 700° F. for starting the catalytic action or surface combustion of the elements of combustion in a gas analyzing cell. The catalytic wire 4A forms one leg of the alternating current Wheatstone bridge 5 and its electrical resistance change due to the catalytic combustion on its surface is measured by the bridge and is representative of the percentage of a gaseous constituent to be measured in the gas sample stream.

In this embodiment the bridge input transformer 13 has been replaced by a constant voltage regulator 13A desirable to maintain the bridge leg 4A in a heated condition when no catalytic combustion is taking place thereon. Thus the bridge is independent of voltage variations in the alternating current supply source.

The arrangement of Fig. 5 employs a two-stage amplification, but without the bridge output transformer 22 and without the resistances 34, 35 and condensers 36, 37 between the motor control tubes and the transformers 32, 33.

A double triode resistance coupled device 52 is provided sensitive to polarity or phase of the current in the conjugate 15 and provides a two stage amplifier for control of the motor control tubes 50, 51. The motor 9 is controlled as previously described in connection with the other figures of the drawings for continuously positioning the indicator 1 and the contact arm of the variable resistance 8, the latter to rebalance the bridge.

The foregoing description serves merely to illustrate by specific application the principle of my invention and should not be taken as defining the scope thereof. This application constitutes a continuation-in-part of my copending application Serial No. 251,388 filed January 17, 1939, now Patent No. 2,275,317, patented March 3, 1942.

What I claim as new, and desire to secure by Letters Patent of the United States, is:

1. Apparatus comprising a Wheatstone bridge, an electrical supply source for said bridge, a pair of electron discharge devices normally in equilibrium with predetermined plate current, means including an impedance leg of said bridge responsive to a variable for causing a potential of variable polarity to be simultaneously applied to the input circuits of said devices so that one of said devices is selectively rendered more conducting in accordance with the polarity of the potential, electromagnetic means electrically associated with the output circuits of said devices operated in one direction or the other in accordance with which one of said devices is rendered more conducting, and electric circuit means arranged to decrease the plate current of the other of said devices simultaneously with the said increase in conductance of the one device.

2. Apparatus comprising means responsive to the magnitude of a variable for establishing an alternating current potential of variable phase or polarity relative to a source of alternating current in accordance with the sense of change in the magnitude of the variable, means including electron discharge means for amplifying the magnitude of said potential, a pair of electron discharge devices each having an input and an output circuit, a motor having reversing windings, an inductive coupling between each of said output circuits and one of said reversing windings, said output circuits arranged to have opposite polarity, the input circuits of said devices being so connected to said amplified potential of variable phase or polarity that one or the other of said devices is rendered more conducting relative to an equilibrium conducting condition and means associated with the output of the device of increased conductivity to simultaneously render the remaining device less conducting relative to said equilibrium conducting condition to relatively vary the impedance of the reversing windings and produce rotation of said motor in a direction depending upon the phase or polarity of said amplified potential.

3. Apparatus comprising means responsive to the magnitude of a variable for establishing an alternating current potential of variable polarity relative to a source of alternating current in accordance with the sense of change in the magnitude of the variable, means including electron discharge means for amplifying the magnitude of said potential, a pair of electron discharge devices each having an input and an output circuit, a motor having opposed shading pole windings and an energizing alternating current field winding, an inductive coupling between each of said output circuits and one of said pole windings, said output circuits arranged to have opposite polarity at any instant, the input circuits of said devices being connected to said amplified potential of variable polarity, means for rendering one or the other of said devices more conducting dependent upon said polarity and means dependent upon said increased conductivity for simultaneously rendering the remaining device less conducting from an equilibrium condition when said amplified potential changes whereby the impedance of one of said pole windings is increased while the impedance of the other pole winding is decreased to thereby produce rotation of said motor in a direction depending upon the polarity of said amplified potential and at a speed depending upon the magnitude of the said established alternating current potential.

4. Apparatus comprising in combination, a balanceable network including a variable impedance and a balancing impedance, a source of alternating current for energizing said network, variations in the magnitude of said variable impedance unbalancing said network and causing an alternating current voltage between two points in said network of one phase upon unbalance of said network in one sense and of opposite phase upon unbalance of said network in opposite sense, means for maintaining said network in balance comprising a pair of electron discharge devices, means for rendering one of the devices more conducting and simultaneously rendering the other device less conducting from an equilibrium condition in dependence upon the phase of the alternating voltage between said points in said network, and means directionally responsive to the space current through said devices for adjusting said balancing impedance to maintain said network in balance.

5. Apparatus comprising in combination, a balanceable network including a variable impedance and a balancing impedance, a source of alternating current for energizing said network, a pair of electron discharge devices having their plate circuits energized from said source of alternating current and arranged so that their plate potentials are of opposite polarity and the input circuits of which are electrically coupled to said balanceable network so that one of said devices is rendered more conducting upon unbalance of said network selectively in dependence upon the sense of unbalance of said network, means responsive to the increased conductivity of said one device to reduce the conductivity of the other device, and reversible means for adjusting said balancing impedance operable in a direction depending upon which one of said devices is rendered more conducting.

6. Apparatus comprising in combination, a balanceable electrical network including a variable impedance and a balancing impedance, a source of alternating current for energizing said network, a pair of control electron discharge devices so connected that their plate potentials are of opposite polarity, an electron tube electrically coupling said devices to said balanceable network so that one or the other of the devices is rendered more conducting from an equilibrium condition upon unbalance of said network selectively in dependence upon the sense of unbalance of said network, means so coupling said discharge devices that increased conductivity of one reduces the conductivity of the other from said equilibrium condition, and reversible means for adjusting said balancing impedance operable in a direction depending upon which one of said devices is rendered more conducting.

7. Apparatus comprising a Wheatstone bridge, an electrical supply source for said bridge, a pair of motor control tubes having their plate circuits energized by alternating current, means including an impedance leg of said bridge responsive to a variable for causing a potential of variable phase or polarity to be simultaneously applied to the input circuits of said tubes so that one or the other of said tubes is selectively rendered more conducting over an equilibrium conductivity in accordance with the phase or polarity of the potential, means associating the input circuit of each tube with the output circuit of the other tube whereby the increase in conductivity of one tube reduces that of the other, and a reversible motor electrically associated with the output circuits of said tubes operated in direction and at a speed in accordance with which tube is rendered more conducting and the extent of the difference in conductivity of the two tubes.

8. Apparatus comprising means responsive to the magnitude of a variable for establishing an alternating current potential of variable polarity or phase relative to a source of alternating current in accordance with the sense of change in the magnitude of the variable, an electron discharge device for amplifying the magnitude of said potential, a pair of normally balanced motor control tubes each having an input and an output circuit, a reversible electric motor having opposed windings, and an inductive coupling between each of said output circuits and one of said motor windings, said output circuits arranged to have opposite polarity and the input circuits of said tubes being connected to said amplified potential of variable polarity whereby one or the other of said tubes is rendered more conducting than the remaining tube and the motor rotates in direction depending upon the polarity of said amplified potential, each tube having a grid biased from the output of the other tube so that increase in the conductivity of one reduces the conductivity of the other, the motor operating at a speed determined by the conductivity unbalance of the said tubes.

9. Apparatus including in combination, an alternating current Wheatstone bridge, a source of alternating current for the bridge, one leg of said bridge comprising an impedance responsive to a variable condition such as temperature producing a potential of variable phase or polarity in the bridge output circuit, a balancing impedance in a second leg of the bridge, a motor having opposed reversing windings and adapted to position said balancing impedance to balance the bridge, a pair of motor control tubes having their output circuits connected respectively with said reversing windings whereby the impedance relation between said windings determines the direction and speed of rotation of the motor, amplifying means responsive to the phase or polarity of the potential in the bridge output circuit connected to control the input circuits of the motor tubes, the plate currents of the motor control tubes being normally in equilibrium at a relatively low conducting value, and electrical means in the tube output circuits whereby when one tube is made more conducting from the equilibrium condition the other tube is made less conducting.

10. Apparatus for maintaining a variable in correspondence with a second variable comprising in combination, a balanceable network including a first impedance variable in correspondence with changes in said first variable, a second impedance variable in correspondence with said second variable and a source of alternating current for energizing said network, a pair of electron discharge devices having their output circuits electrically coupled to said network so that one of said devices is rendered more conducting upon unbalance of said network in one sense and the other of said devices is rendered more conducting upon unbalance of said network in opposite sense, both devices normally slightly conducting when the system is in equilibrium, electric circuit provisions whereby when one of the electron discharge devices is rendered more conducting from the equilibrium condition the other said device is simultaneously rendered less conducting relative to the equilibrium condition of conductance, and means selectively operated in accordance with which one of said electron discharge devices is rendered more conducting from the equilibrium condition for adjusting the magnitude of said first variable in a sense to restore said network to balance.

11. Apparatus comprising in combination, a balanceable network including a variable impedance and a balancing impedance, a source of alternating current for energizing said network, variations in the magnitude of said variable impedance unbalancing said network and causing an alternating current voltage between two points in said network of one phase upon unbalance of said network in one sense and of opposite phase upon unbalance of said network in opposite sense, means for maintaining said network in balance comprising a pair of electron discharge devices, means for rendering one of the devices more conducting and simultaneously rendering the other device less conducting from an equilibrium condition in dependence upon the phase of the alternating voltage between said points in said network, and means responsive to the space current through said devices for regulating the direction and speed of adjustment of said balancing impedance to maintain said bridge in balance.

12. Apparatus comprising in combination, a balanceable network including a variable impedance and a balancing impedance, a source of alternating current for energizing said network, a pair of electron discharge devices having their plate circuits energized from said source of alternating current and arranged so that their plate potentials are always of like polarity and the input circuits of which are so electrically coupled to said balanceable network that one of said devices is rendered more conducting upon unbalance of said network selectively in dependence upon the sense of unbalance of said network, electric means responsive to the said increase of conductivity of said one electron discharge device to correspondingly reduce the conductivity of the other electron discharge device and reversible means for adjusting said balancing impedance operable in a direction and at a speed depending upon which one of said devices is rendered more conducting and to the extent of the difference in conductivity of the two tubes.

JOHN D. RYDER.